(12) United States Patent
Newell

(10) Patent No.: US 11,829,812 B2
(45) Date of Patent: Nov. 28, 2023

(54) APPLICATION PROGRAMMING INTERFACE OBFUSCATION SYSTEMS AND METHODS

(71) Applicant: DISH Wireless L.L.C., Englewood, CO (US)

(72) Inventor: Nicholas Newell, Centennial, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 17/501,933

(22) Filed: Oct. 14, 2021

(65) Prior Publication Data

US 2023/0123141 A1   Apr. 20, 2023

(51) Int. Cl.
*G06F 7/06* (2006.01)
*G06F 9/54* (2006.01)

(52) U.S. Cl.
CPC .................................. *G06F 9/547* (2013.01)

(58) Field of Classification Search
CPC ...................................................... G06F 9/547
See application file for complete search history.

(56) References Cited

U.S. PATENT DOCUMENTS

| | | | | |
|---|---|---|---|---|
| 7,724,918 B2* | 5/2010 | Balakrishnan | ........ | G06F 40/157 380/246 |
| 11,010,191 B1* | 5/2021 | Hornbeck | ............. | H04L 67/133 |
| 2006/0026114 A1* | 2/2006 | Gregoire | ............. | G06F 16/9535 |
| 2009/0144829 A1* | 6/2009 | Grigsby | ............. | G06F 21/6263 726/26 |
| 2013/0060885 A1* | 3/2013 | Fu | ........................ | G06F 16/9574 709/217 |
| 2017/0034112 A1* | 2/2017 | Perlegos | ................. | H04W 4/21 |
| 2020/0192952 A1* | 6/2020 | Luus | ....................... | G06F 40/35 |

OTHER PUBLICATIONS

Lucas Dixon et al. "Network Traffic Obfuscation and Automated Internet Censorship" (Year: 2016).*

* cited by examiner

*Primary Examiner* — Kevin L Young
*Assistant Examiner* — Abdou K Seye
(74) *Attorney, Agent, or Firm* — Perkins Coie LLP

(57) ABSTRACT

A method for obfuscating an application programming interface (API) can include creating a polarization library. The library can include for each of a plurality of websites: website endpoints, corresponding website endpoint parameters, and an assigned industry category. An API structure of a root API to be obfuscated can be extracted, including root endpoints and corresponding root endpoint parameters. An industry category can be identified for the root API and a website is selected from the polarization library that is in an industry category that is distinct from the root API category. An obfuscator API is created with the extracted API structure using website endpoints and website endpoint parameters from the selected website that match the structure of the root API.

15 Claims, 9 Drawing Sheets

APPLICATION PROGRAMMING INTERFACE OBFUSCATION SYSTEMS AND METHODS

TECHNICAL FIELD

This application is directed to application programming interfaces and more specifically, to protecting the underlying software structure associated with an application programming interface.

BACKGROUND

Businesses have concerns with competitors gaining access to their open application programming interface (API) because competitors can potentially deduce intellectual property, system knowledge, and data by interacting with the endpoints in the API. Standards for documenting API's, such as Swagger.io, can make this problem worse by rendering the API human-readable and making it easier for competitors to copy and paste this information. Therefore, in some cases businesses will not allow e.g., competitors to use their API in order to prevent them from being able to deduce the intellectual property associated with the system. When two competitors are working with the same customer, this situation can prevent the two competitors from collaborating for the benefit of the customer, for example.

SUMMARY

In some embodiments, a method for obfuscating an API can include creating a polarization library. The library can include for each of a plurality of websites: website endpoints, corresponding website endpoint parameters, and an assigned industry category. An API structure of a root API to be obfuscated can be extracted, including root endpoints and corresponding root endpoint parameters. An industry category can be identified for the root API and a website is selected from the polarization library that is in an industry category that is distinct from the root API category. An obfuscator API is created with the extracted API structure using website endpoints and website endpoint parameters from the selected website that match the structure of the root API.

In some aspects of the disclosed technology, selecting the website from the polarization library that is in an industry category distinct from the root API industry category comprises randomly selecting an industry category other than the root API industry category. In other aspects, selecting the website from the polarization library that is in an industry category distinct from the root API industry category comprises arranging the industry categories on a circular scale of 0 to 360 degrees in order of similarity and selecting the industry category that is diametrically opposite the root API industry category. In some aspects, creating the polarization library can comprise identifying website keywords contained in each of the plurality of websites, assigning the industry category to each of the plurality of websites based on the corresponding website keywords, extracting the website endpoints and the corresponding website endpoint parameters associated with each of the plurality of websites, and storing the website endpoints, corresponding website endpoint parameters, website keywords, and the assigned industry category for each website in the polarization library. In further aspects, identifying a category for the root API comprises identifying root keywords contained in the root API and comparing the identified root keywords to the website keywords stored in the polarization library. In other aspects, the method can further comprise mapping the endpoints of the obfuscator API to the corresponding endpoints of the root API.

In some embodiments, a system for obfuscating an application programming interface can include one or more processors and one or more memory devices having instructions stored thereon. When executed, the instructions cause the processors to create a polarization library. The library can include for each of a plurality of websites: website endpoints, corresponding website endpoint parameters, and an assigned industry category. The instructions can also cause the processors to extract an API structure of a root API to be obfuscated, including root endpoints and corresponding root endpoint parameters. An industry category can be identified for the root API and a website is selected from the polarization library that is in an industry category that is distinct from the root API category. An obfuscator API is created with the extracted API structure using website endpoints and website endpoint parameters from the selected website that match the structure of the root API.

In some embodiments, a non-transitory processor readable memory device stores instructions that, when executed by one or more processors, cause the one or more processors to perform operations. The operations can include creating a polarization library. The library can include for each of a plurality of websites: website endpoints, corresponding website endpoint parameters, and an assigned industry category. An API structure of a root API to be obfuscated can be extracted, including root endpoints and corresponding root endpoint parameters. An industry category can be identified for the root API and a website is selected from the polarization library that is in an industry category that is distinct from the root API category. An obfuscator API is created with the extracted API structure using website endpoints and website endpoint parameters from the selected website that match the structure of the root API.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
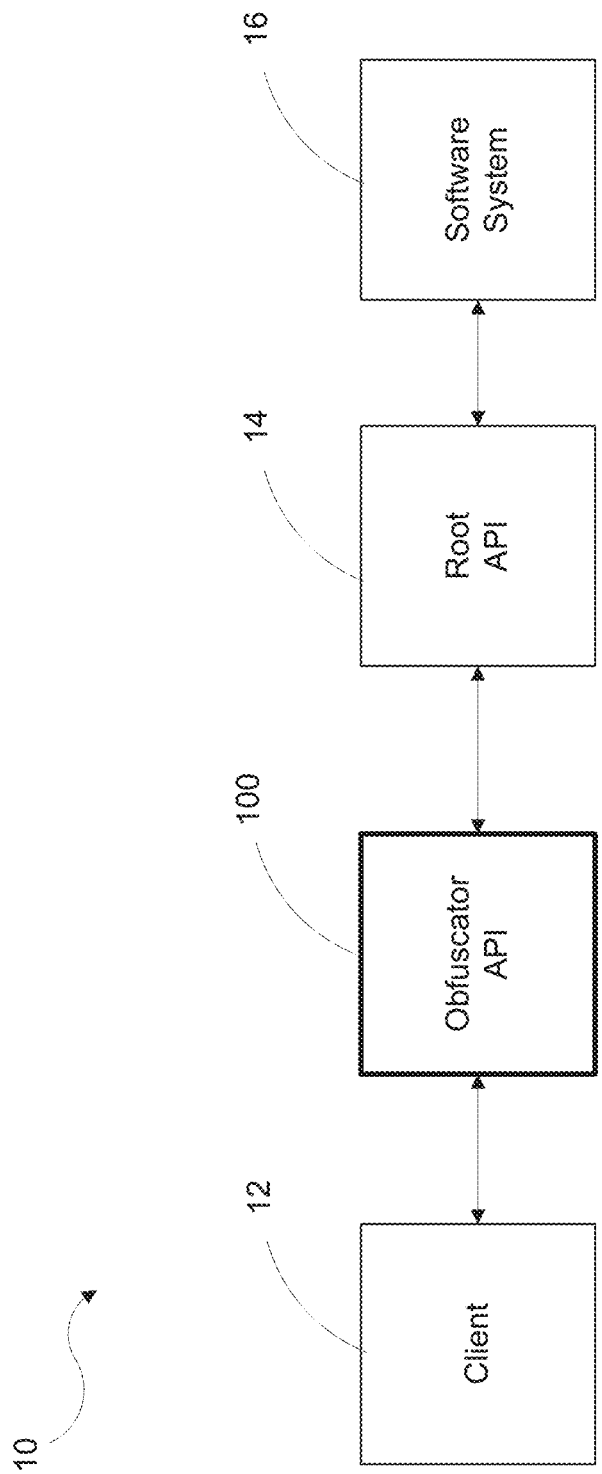
FIG. 1 is a block diagram illustrating an environment in which an obfuscator API can operate according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates an environment 10 in which an Obfuscator API 100 can operate according to some embodiments of the disclosed technology. Typically an API, such as Root API 14, facilitates interactions between a client device 12 and a system 16. However, some businesses have concerns that an open API can expose intellectual property associated with the system 16 including data and system knowledge. Therefore, in some cases businesses will not allow e.g., competitors to use their API 14 in order to prevent them from being able to deduce the intellectual property associated with the system 16. When two competitors are working with the same customer, this situation can prevent the two competitors from collaborating for the benefit of the customer, for example. The disclosed technology provides a system for creating an Obfuscator API 100 that obfuscates the Root API 14. As explained more fully below, the Obfuscator API has an endpoint structure corresponding to the Root API's structure but with different endpoint terminology. The different terminology prevents a competitor from reverse engineering the Root API 14 and the underlying System 16. Accordingly, a first competitor (e.g., client 12) can interact with a second competitor's Root API 14 and Software System 16 via the Obfuscator API 100. The disclosed technology constitutes an improvement to conventional API technology by providing time and resource efficient systems and methods for creating obfuscator APIs that solve the heretofore unappreciated problem of how to allow competitors to interact with their respective APIs without compromising the underlying intellectual property.

Figure 2:
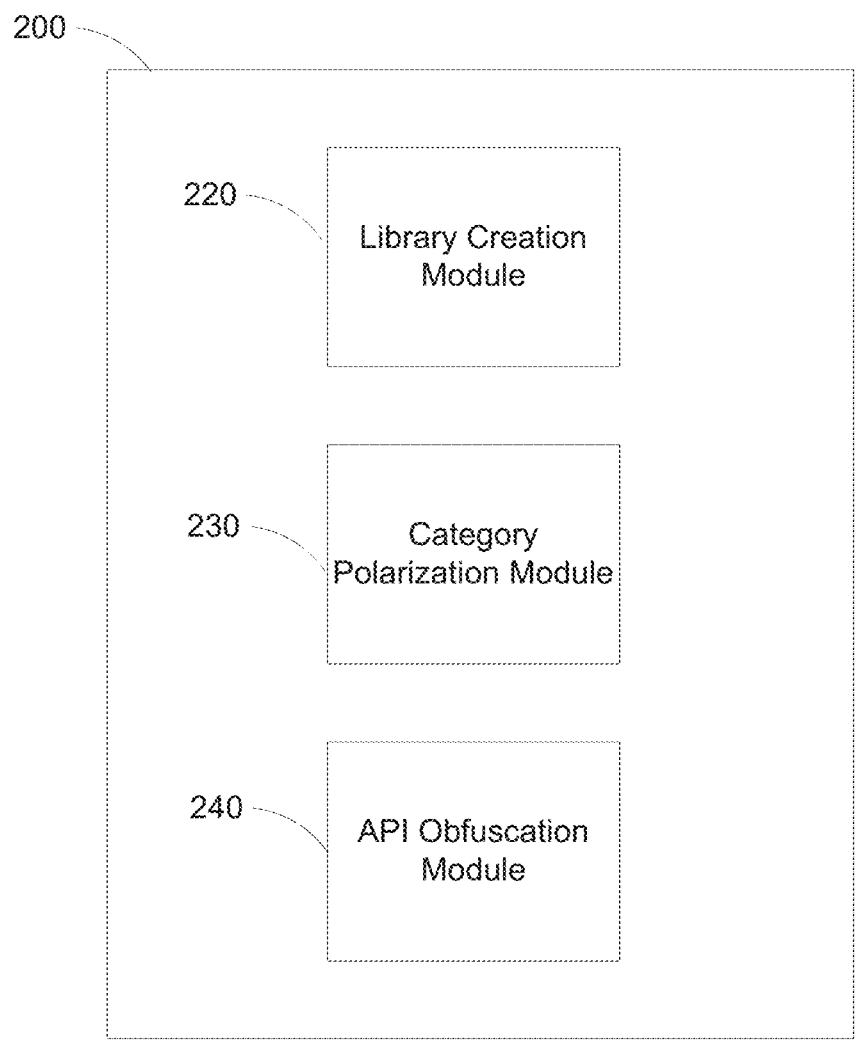
FIG. 2 is a block diagram illustrating an overview of an API obfuscation system according to some embodiments of the disclosed technology.

FIG. 2 is a block diagram of an API obfuscation system 200 according to some embodiments of the disclosed technology. The API obfuscation system 200 can include a Polarization Library Creation Module 220, a Category Polarization Module 230, and an API Obfuscation Module 240, for example. In some embodiments, the Polarization Library Creation Module 220 is configured to create a polarization library by traversing standard websites for existing companies and identifying the most common keywords. Available APIs for those sites can also be traversed to place endpoints, names, parameters, keywords, etc. in the library. Each website and API is categorized using natural language processing to identify a category from the keywords. Some example categories can include Agriculture, Construction, Education, Arts, Entertainment, Finance, Insurance, Healthcare, Mining, Information, Transportation, Retail, Utilities, Manufacturing, and Real Estate. The library also includes information for the endpoints from the websites and APIs including:

a. Endpoints
    i. Name
    ii. Type (GET, PUT, POST, DELETE)
    iii. Parameters
      1. Name
      2. Format
      3. Required or Optional
      4. Example Response
    iv. Response Codes In some embodiments, the Category Polarization Module 230 determines an industry category for a root API to be obfuscated by identifying keywords contained in the root API and matching the identified keywords to the website keywords stored in the polarization library. The Category Polarization Module 230 then selects an industry category from the polarization library that is distinct from the determined root API category. The Category Polarization Module 230 can select the distinct industry category by randomly choosing a category from the polarization library or with another suitable method such as the polarization methods described below with respect to FIGS. 5 and 6, for example. As an example, if the root API is for a "pet store" it might be categorized under "pets." A category distinct from "pets" could be "manufacturing," for example.

In some embodiments the API Obfuscation Module 240 can create an Obfuscator API with analogous endpoints to those that exist in a typical site for the distinct category. These endpoints will share the exact same structure as the originally scanned root API structure, but the names of endpoints and parameters will match the distinct category rather than the original site. Using the "pet store" example above, the site in the "manufacturing" category that best matches the structure of the "pet store" API might be "cabinets." Thus, each endpoint in the root API can be renamed based on the "cabinet" website. For example, the /pet/{petId}/uploadImage endpoint used for POSTing the image of a pet may be represented as /cabinet/{cabinetId}/uploadImage.

APIs typically have some form of documentation associated with them. For example, the endpoints of a RESTful API can be documented according to industry standards with e.g., Swagger (swagger.io). The API Obfuscation Module 240 can traverse the available endpoints of the root API by scraping the information from the documentation.

The owner of the root API can redirect the original API to the Obfuscator API so that a competitor will land on e.g., "cabinet/endpoint" instead of "petstore/endpoint" and they can preserve their intellectual property. The owner can still choose to have "friendly" users land on the original root API. Both are usable and achieve the same result in the backend system behind the root API. In addition to creating the API obfuscator, the API obfuscation system 200 can also create the documentation site for the obfuscator API with the names of opposite endpoints and parameters listed. This completes the end-to-end experience for users to make this look just like a normal API.

Figure 3:
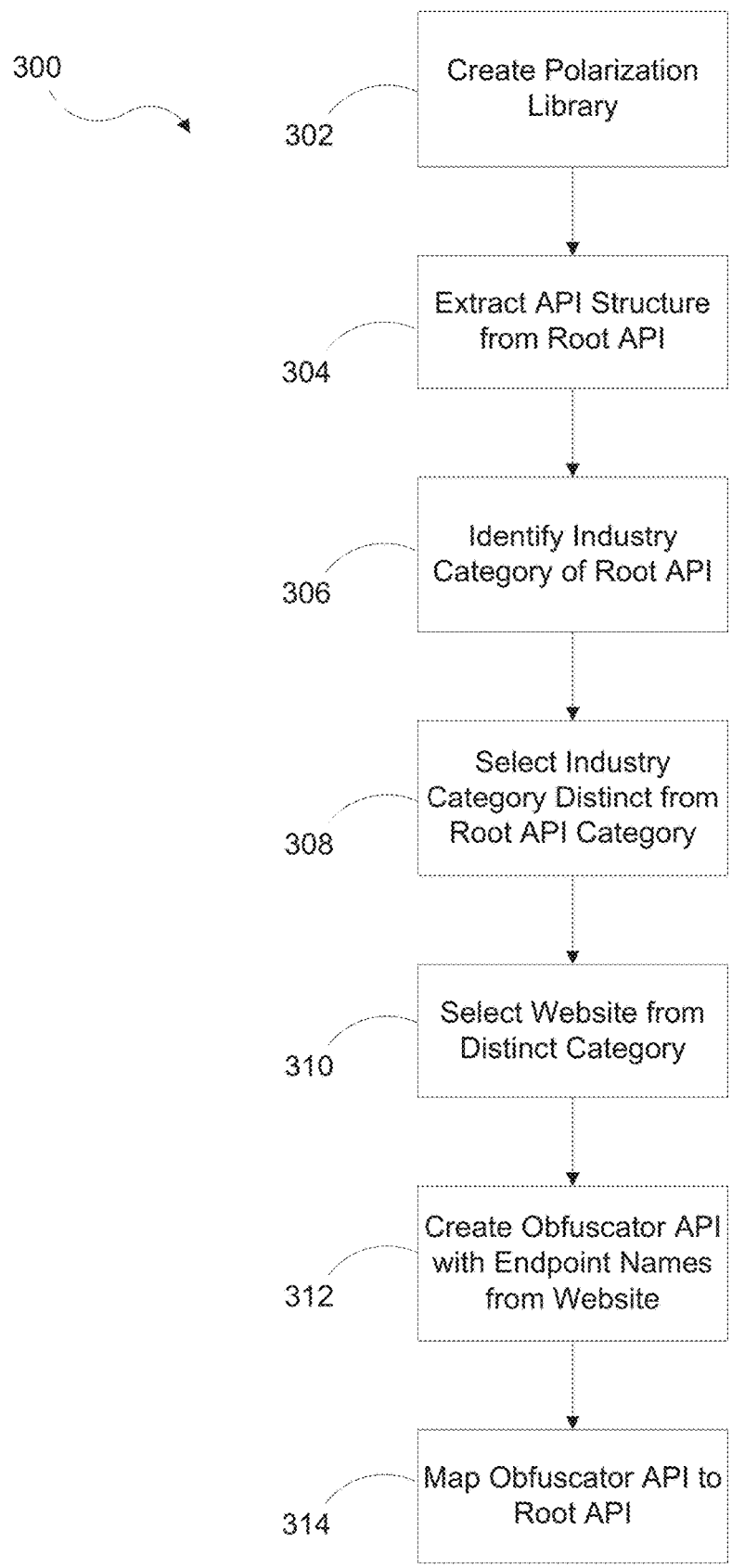
FIG. 3 is a flow diagram showing a method for obfuscating an application API according to some embodiments of the disclosed technology.

FIG. 3 is a flow diagram showing a method 300 for obfuscating an application API according to some embodiments of the disclosed technology. The method 300 can include creating a polarization library at step 302. The library includes for each of a plurality of websites: website endpoints, corresponding website endpoint parameters, and an assigned industry category. At step 304, the method includes extracting an API structure of a root API to be obfuscated, including root endpoints and corresponding root endpoint parameters. An industry category is identified for the root API at step 306 and an industry category distinct from the root API's category is selected at step 308. In some embodiments, the root API category is identified by identifying root keywords contained in the root API and comparing the identified root keywords to website keywords stored in the polarization library. At step 310 a website is selected from the polarization library that is in the distinct industry category. The method also includes, at step 312, creating an obfuscator API with the extracted API structure using names of website endpoints and website endpoint parameters from the selected website that match the structure of the root API. At step 314, the obfuscator API can be mapped to the Root API. In operation, the owner of the root API (or a trusted third party e.g., a customer) can provide the obfuscator API endpoints to anyone that it wishes to hide the root API from, such as a competitor.

Figure 4:
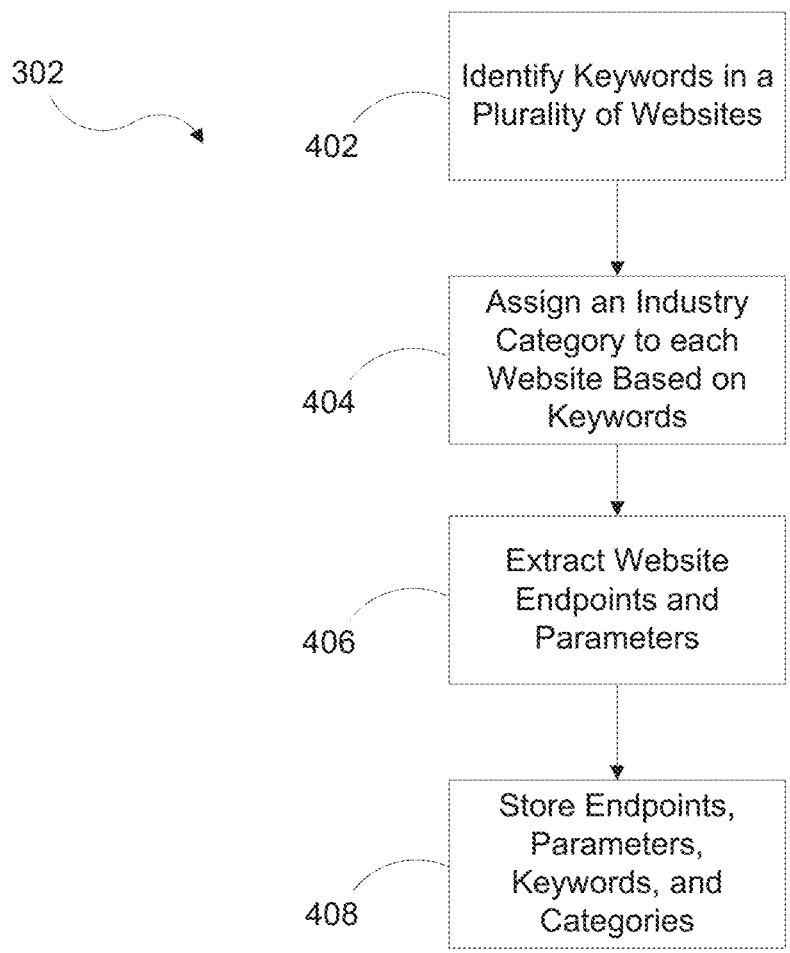
FIG. 4 is a flow diagram showing a method for creating a polarization library according to some embodiments of the disclosed technology.

FIG. 4 is a flow diagram showing a method 302 for creating a polarization library according to some embodiments of the disclosed technology. The method 302 can include identifying website keywords contained in each of a plurality of websites at step 402 and assigning an industry category to each of the plurality of websites based on the corresponding website keywords at step 404. The method 302 also includes extracting, at step 406, website endpoints and corresponding website endpoint parameters associated with each of the plurality of websites. At step 408, the website endpoints, corresponding website endpoint parameters, website keywords, and the assigned industry category for each website are stored in the polarization library.

Figure 5:
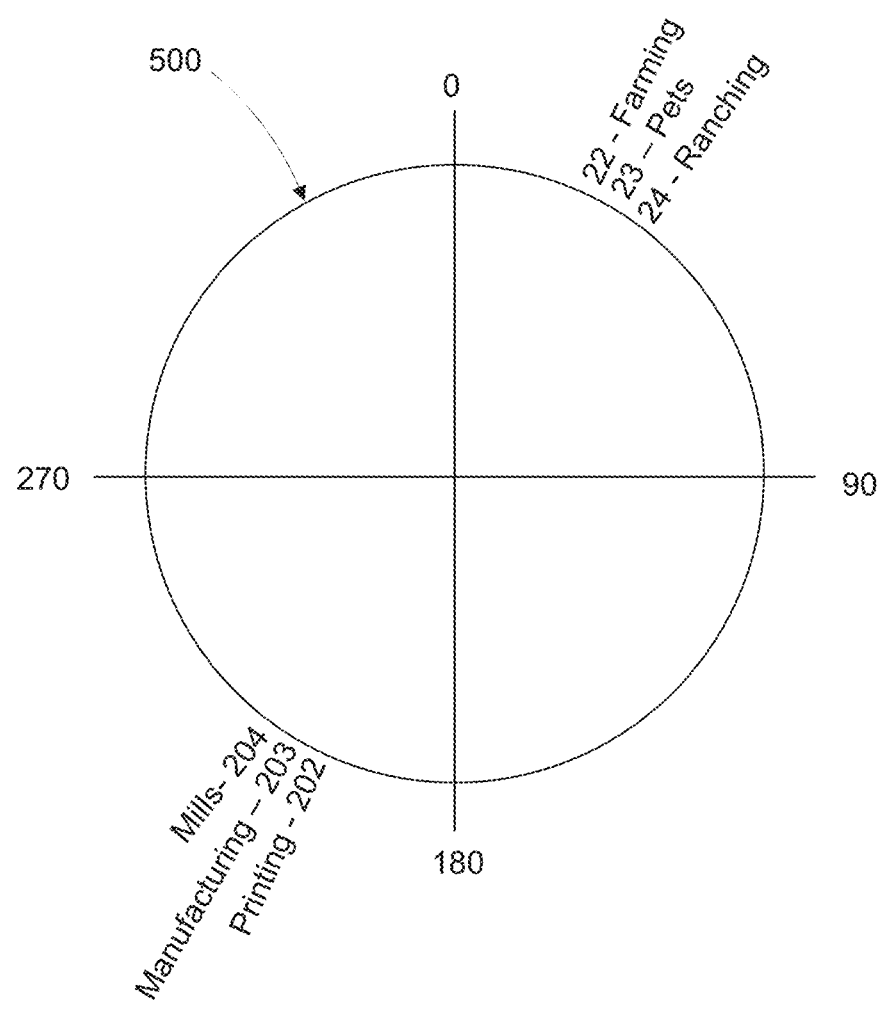
FIG. 5 is a diagram illustrating a method for selecting an industry category that is distinct from a root API category according to some embodiments of the disclosed technology.

FIG. 5 is a diagram illustrating a method for selecting an industry category that is distinct e.g., diametrically opposed from a root API category according to some embodiments of the disclosed technology. As shown in the figure, the industry categories e.g., Farming, Pets, Ranching, Mills, Manufacturing, and Printing can be arranged in order of similarity on a circular scale 500 of 0 to 360 degrees. The circular scale 500 is also referred to herein as a "polarization scale." Categories that are very similar will exist near each other on the circle (e.g., 22, 23, 24 degrees) while those that are completely different will exist opposite each other on the circle (e.g., 23 and 203 degrees). For example, Pets may be 23, Ranching may be 24, and Farming may be 22, while Manufacturing may be 203, Printing may be 202, and Mills may be 204.

In some embodiments, the system defines the industry category that is distinct from the root API category as the category that is diametrically opposite the root API category on the polarization scale 500. For example, if the root API category for a pet store is Pets at 23 degrees, the polar opposite is Manufacturing at 203 degrees. The diametrically opposite category can be calculated by adding 180 degrees to the root API category when the root API category is positioned on the polarization scale at a position less than 180 degrees and subtracting 180 degrees from the root API category when the root API category is positioned on the polarization scale at a position greater than or equal to 180 degrees.

Figure 6:
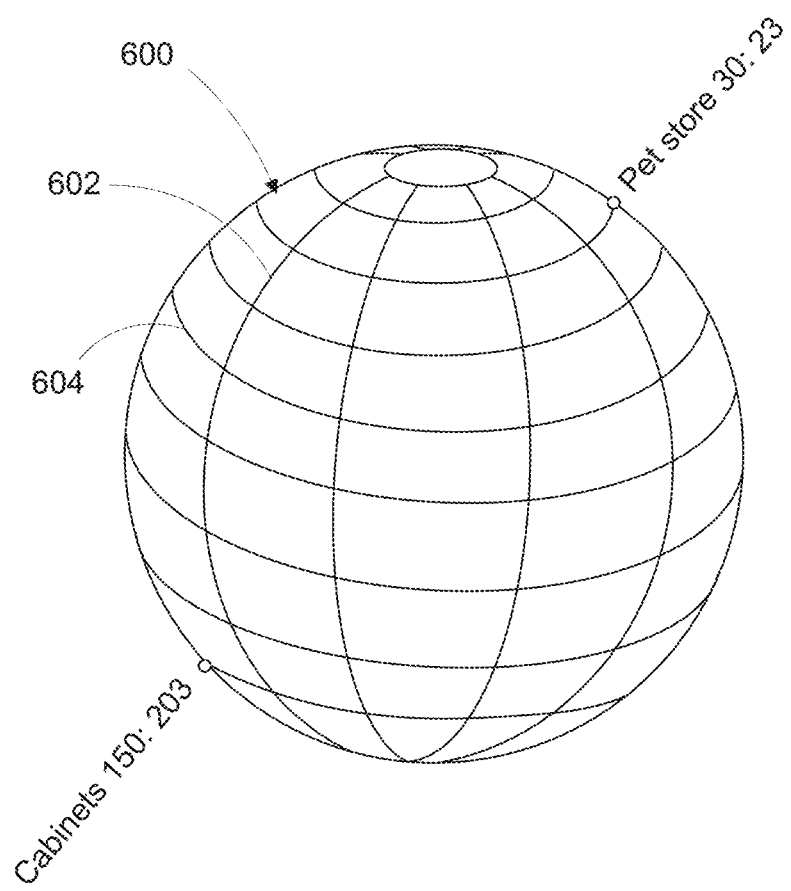
FIG. 6 is a diagram illustrating a method for selecting an industry category that is distinct from a root API category according to some embodiments of the disclosed technology.

FIG. 6 is a diagram illustrating a method for selecting an industry category that is distinct e.g., the polar opposite of the root API category according to some embodiments of the disclosed technology. As shown in the figure, the industry categories can be arranged on a sphere 600 in order of similarity on the lines of longitude 602 from 0 to 360 degrees. Each website or company in each category can also be arranged on a line of latitude 604 corresponding to e.g., the size of the company (e.g., revenue). In some embodiments, the system defines the industry category that is distinct from the root API category as the category that is the polar opposite of the root API on the sphere 600. For example, if the root API category is Pets at 23 degrees longitude, the polar opposite is Manufacturing at 203 degrees longitude. Furthermore, the website or company within the polar opposite category can be selected based on the latitude of the root API company size (e.g., 0 to 180 degrees). Accordingly, if the root API company size is relatively small, the polar opposite company could be relatively large. For example, if the root API size for Pet Store is relatively small at 30 degrees latitude, the polar opposite is Cabinets at 150 degrees latitude. In some embodiments, additional dimensions can be included based on altitude or depth from the surface of the sphere.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 7:
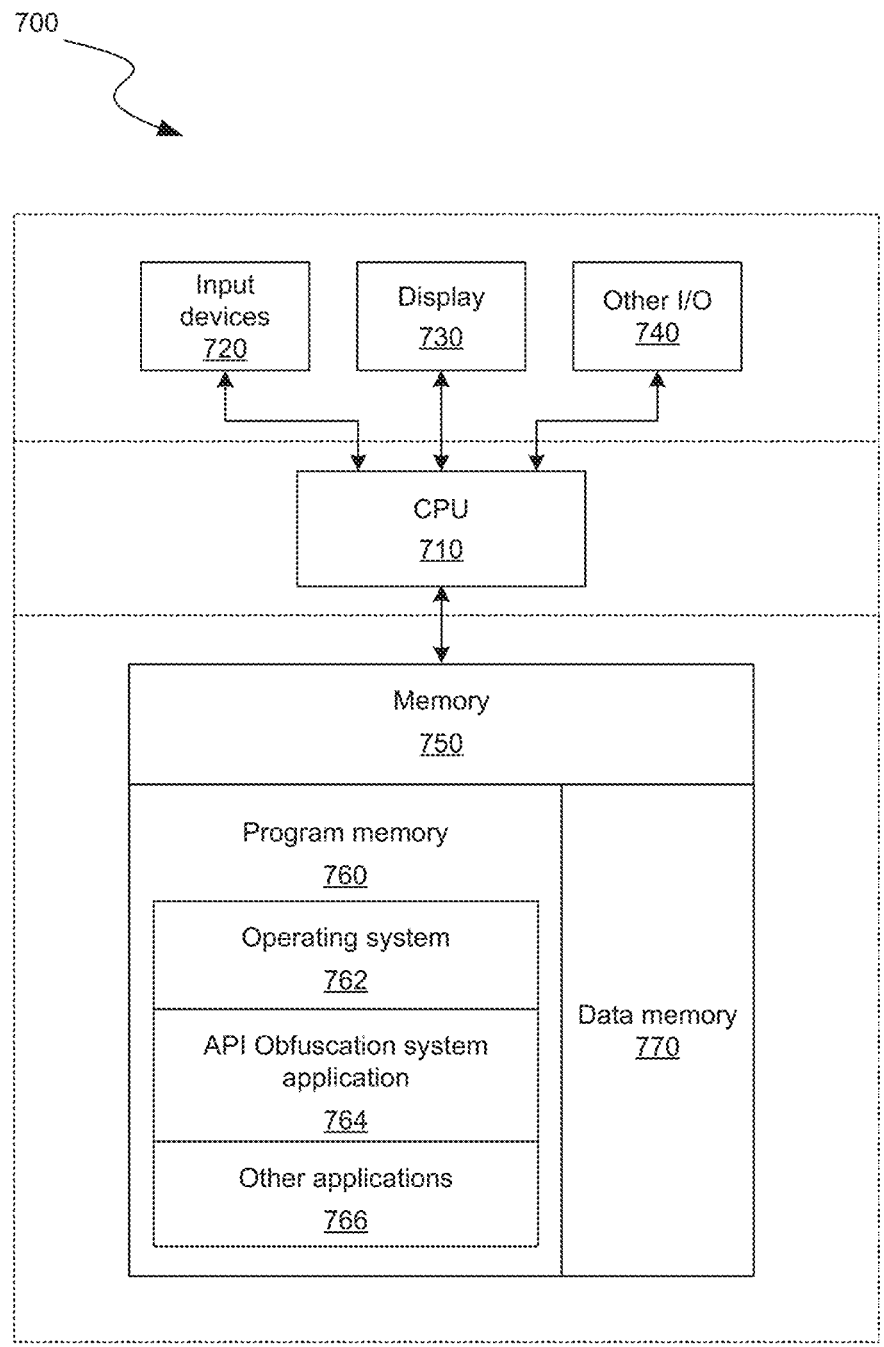
FIG. 7 is a block diagram illustrating an overview of devices on which some implementations can operate.

Several implementations are discussed below in more detail in reference to the figures. FIG. 7 is a block diagram illustrating an overview of devices on which some implementations of the disclosed technology can operate. The devices can comprise hardware components of a device 700 that creates an obfuscator API. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: televisions; mobile devices; an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, the API obfuscation system application 764, and other application programs 766. Memory 750 can also include data memory 770 that can include the polarization library information, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 8:
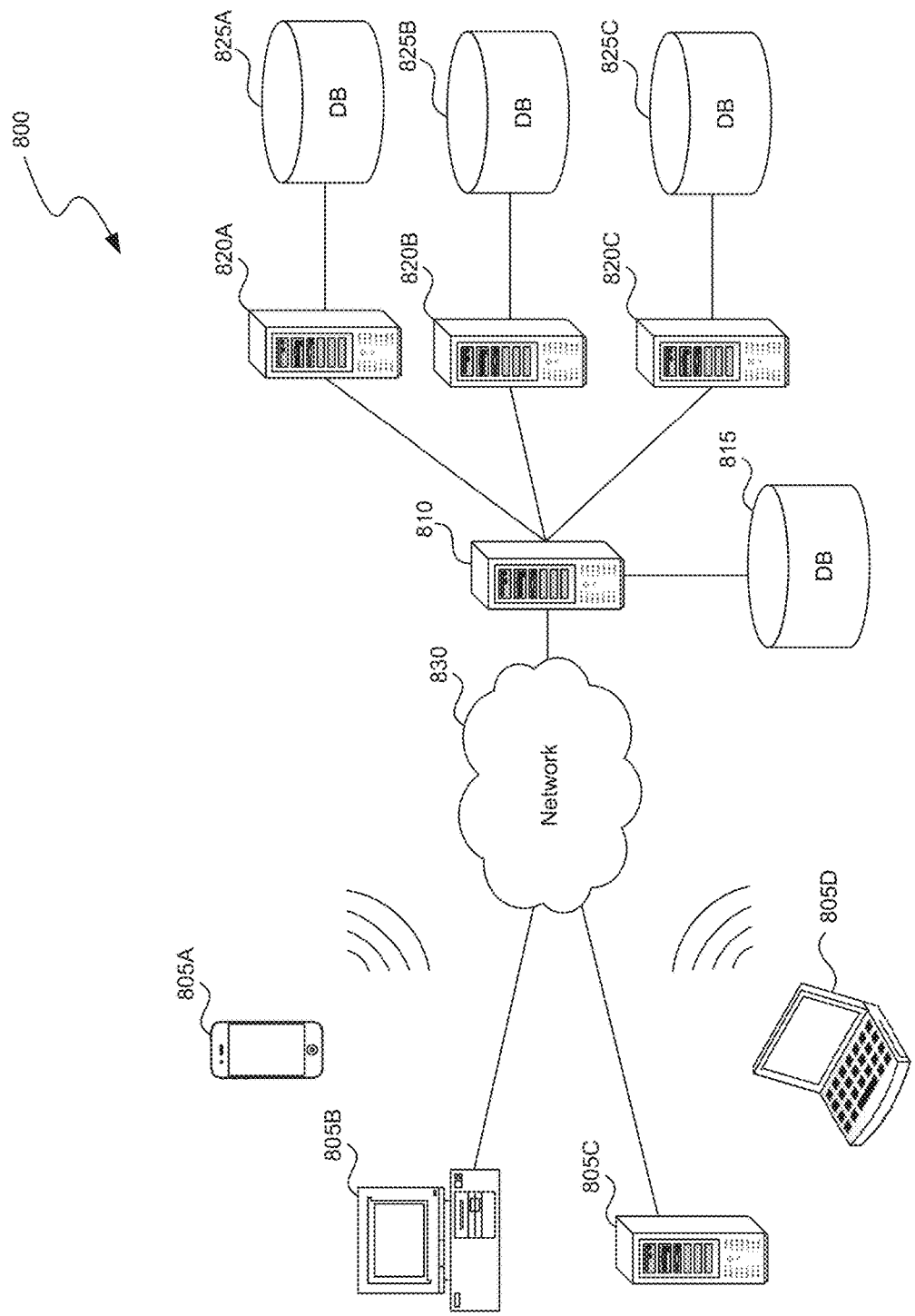
FIG. 8 is a block diagram illustrating an overview of an environment in which some implementations can operate.

FIG. 8 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information such as the polarization library, obfuscator API endpoints, and categories. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 9:
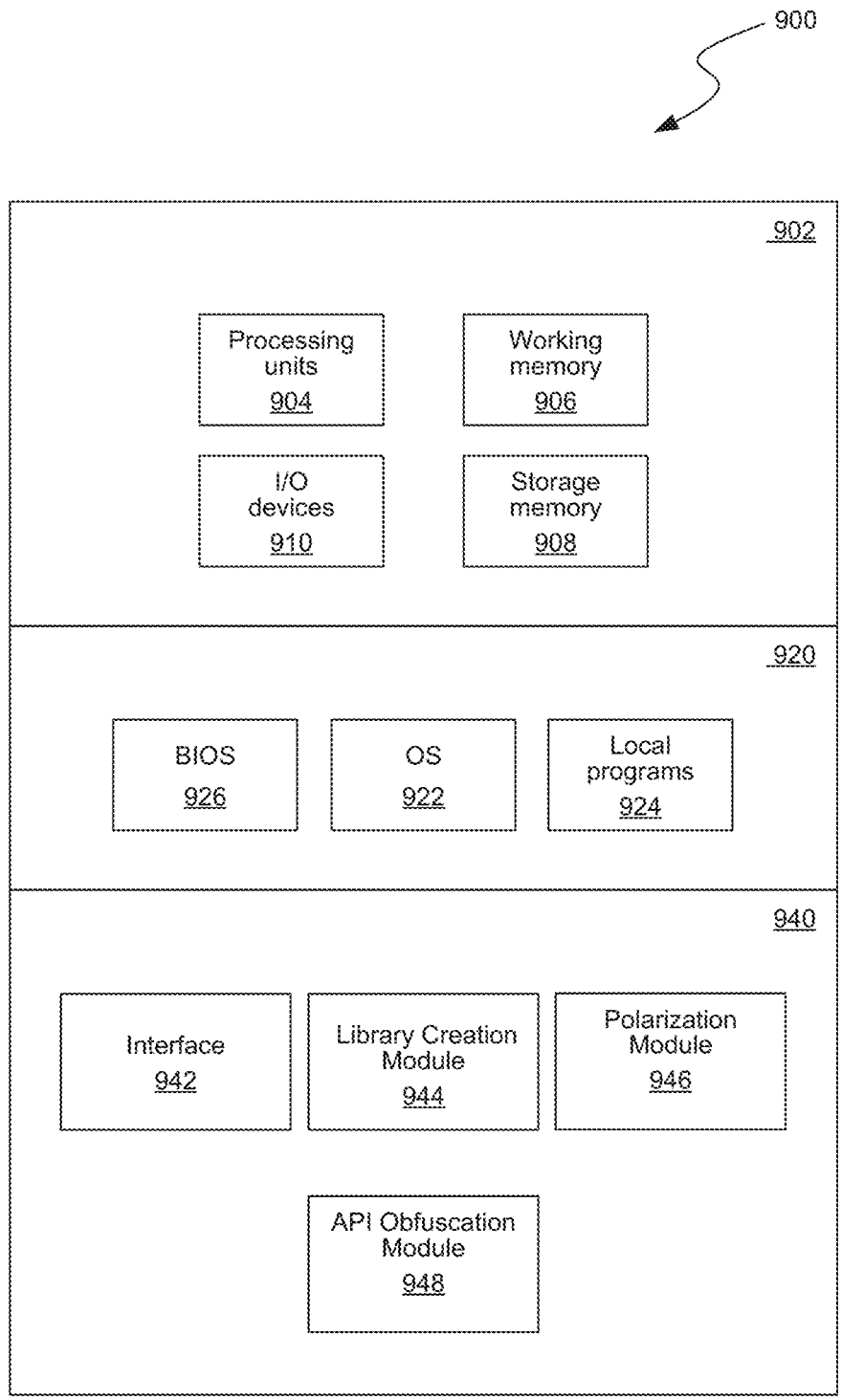
FIG. 9 is a block diagram illustrating components which, in some implementations, can be used in a system employing the disclosed technology.

FIG. 9 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include a Library Creation Module 944, Polarization Module 946, API Obfuscation Module 948, and components that can be used for transferring data and controlling the specialized components, such as interface 942. In some implementations, components 900 can be in a computing system that is distributed across multiple computing devices or can be an interface to a server-based application executing one or more of specialized components 940.

Those skilled in the art will appreciate that the components illustrated in FIGS. 7-9 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for obfuscating an application programming interface (API), the method comprising:
    creating a polarization library, the polarization library including for each of a plurality of websites: website endpoints, corresponding website endpoint parameters, and
    assigned industry categories;
    extracting an API structure of a root API to be obfuscated, including root endpoints and corresponding root endpoint parameters;
    identifying a first industry category for the root API;
    selecting a website from the polarization library that is in an industry category that is distinct from the first industry category by randomly selecting a second industry category that is different than the first industry category; and
    creating an obfuscator API with the API structure using website endpoints and website endpoint parameters from the selected website that match the API structure of the root API.

2. The method of claim 1, wherein selecting the website from the polarization library that is in the industry category distinct from the first industry category comprises arranging the assigned industry categories on a circular scale of 0 to 360 degrees in order of similarity and selecting the second industry category that is diametrically opposite the first industry category.

3. The method of claim 1, wherein creating the polarization library comprises:
    identifying website keywords contained in each of the plurality of websites;
    assigning the industry category to each of the plurality of websites based on the corresponding identified website keywords;
    extracting the website endpoints and the corresponding website endpoint parameters associated with each of the plurality of websites; and
    storing the website endpoints, corresponding website endpoint parameters, website keywords, and the assigned industry category for each website in the polarization library.

4. The method of claim 3, wherein identifying the first industry category for the root API comprises identifying root keywords contained in the root API and comparing the identified root keywords to the website keywords stored in the polarization library.

5. The method of claim 1, further comprising mapping the endpoints of the obfuscator API to the corresponding matching of the root API.

6. A system for obfuscating an application programming interface (API), the system comprising:
    one or more processors; and
    one or more memory devices having stored thereon instructions that when executed by the one or more processors cause the one or more processors to:
        create a polarization library, the polarization library including for each of a plurality of websites: website endpoints, corresponding website endpoint parameters, and
        assigned industry categories;
        extract an API structure of a root API to be obfuscated, including root endpoints and corresponding root endpoint parameters;
        identify a first industry category for the root API;
        select a website from the polarization library that is in an industry category that is distinct from the first industry category by randomly selecting a second industry category that is different than the first industry category; and
        create an obfuscator API with the API structure using website endpoints and website endpoint parameters from the selected website that match the API structure of the root API.

7. The system of claim 6, wherein selecting the website from the polarization library that is in the industry category distinct from the first industry category comprises arranging the assigned industry categories on a circular scale of 0 to 360 degrees in order of similarity and selecting the second industry category that is diametrically opposite the first industry category.

8. The system of claim 6, wherein creating the polarization library comprises:
identifying website keywords contained in each of the plurality of websites;
assigning the industry category to each of the plurality of websites based on corresponding identified website keywords;
extracting the website endpoints and the corresponding website endpoint parameters associated with each of the plurality of websites; and
storing the website endpoints, corresponding website endpoint parameters, website keywords, and the assigned industry category for each website in the polarization library.

9. The system of claim 8, wherein identifying the first industry category for the root API comprises identifying root keywords contained in the root API and comparing the identified root keywords to the website keywords stored in the polarization library.

10. The system of claim 6, wherein the one or more memory devices have stored thereon further instructions that, when executed by the one or more processors, cause the one or more processors to map the endpoints of the obfuscator API to the corresponding matching endpoints of the root API.

11. A non-transitory processor readable memory device, comprising instructions stored thereon that when executed by one or more processors, cause the one or more processors to:
create a polarization library, the polarization library including for each of a plurality of websites: website endpoints, corresponding website endpoint parameters, and
assigned industry categories;
extract an API structure of a root API to be obfuscated, including root endpoints and corresponding root endpoint parameters;
identify a first industry category for the root API;
select a website from the polarization library that is in an industry category that is distinct from the first industry category by randomly selecting a second industry category that is different than the first industry category; and
create an obfuscator API with the API structure using website endpoints and website endpoint parameters from the selected website that match the API structure of the root API.

12. The non-transitory processor readable memory device of claim 11, wherein selecting the website from the polarization library that is in the industry category distinct from the first industry category comprises arranging the assigned industry categories on a circular scale of 0 to 360 degrees in order of similarity and selecting the second industry category that is diametrically opposite the root API industry category.

13. The non-transitory processor readable memory device of claim 11, wherein creating the polarization library comprises:
identifying website keywords contained in each of the plurality of websites;
assigning the industry category to each of the plurality of websites based on corresponding identified website keywords;
extracting the website endpoints and the corresponding website endpoint parameters associated with each of the plurality of websites; and
storing the website endpoints, corresponding website endpoint parameters, website keywords, and the assigned industry category for each website in the polarization library.

14. The non-transitory processor readable memory device of claim 13, wherein identifying the first industry category for the root API comprises identifying root keywords contained in the root API and comparing the identified root keywords to the website keywords stored in the polarization library.

15. The non-transitory processor readable memory device of claim 11, further comprising instructions that, when executed by the one or more processors, cause the one or more processors to map the endpoints of the obfuscator API to the corresponding matching endpoints of the root API.

* * * * *